(12) United States Patent
Gu

(10) Patent No.: US 7,472,176 B2
(45) Date of Patent: Dec. 30, 2008

(54) METHOD FOR APPARATUS ACQUIRING IP ADDRESS AUTOMATICALLY

(75) Inventor: Jiangchun Gu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 726 days.

(21) Appl. No.: 10/481,896

(22) PCT Filed: Apr. 29, 2002

(86) PCT No.: PCT/CN02/00304

§ 371 (c)(1),
(2), (4) Date: Dec. 23, 2003

(87) PCT Pub. No.: WO03/003769

PCT Pub. Date: Jan. 9, 2003

(65) Prior Publication Data

US 2004/0153531 A1 Aug. 5, 2004

(30) Foreign Application Priority Data

Jun. 27, 2001 (CN) .............................. 01 1 22525

(51) Int. Cl.
*G06F 15/16* (2006.01)
*G06F 15/177* (2006.01)

(52) U.S. Cl. ...................... 709/220; 709/219
(58) Field of Classification Search ......... 709/220–222, 709/228, 230, 245, 219; 370/392, 401
See application file for complete search history.

(56) References Cited

U.S. PATENT DOCUMENTS

| 5,526,489 A | * | 6/1996 | Nilakantan et al. | 709/228 |
| 5,745,699 A | * | 4/1998 | Lynn et al. | 709/245 |
| 5,854,901 A | * | 12/1998 | Cole et al. | 709/245 |
| 5,978,854 A | * | 11/1999 | Fujimori et al. | 709/245 |
| 6,000,041 A | * | 12/1999 | Baker et al. | 714/39 |
| 6,061,739 A | * | 5/2000 | Reed et al. | 709/245 |
| 6,532,217 B1 | * | 3/2003 | Alkhatib et al. | 370/252 |

(Continued)

FOREIGN PATENT DOCUMENTS

CA 2328840 6/2001

(Continued)

*Primary Examiner*—Jeff Pwu
*Assistant Examiner*—Scott M Sciacca

(57) ABSTRACT

Disclosed is a method for a device without unique hardware address to obtain IP address automatically. This method comprises the steps of: the device dividing the hardware address field in the BOOTP request packet into sub-fields which are filled in by the device and the relay proxy servers forwarding the BOOTP request packet; the BOOTP server assigning an IP address to the device according to the contents in all sub-fields in the received BOOTP request packet, then generating a BOOTP response packet including the IP address of the device; and the device obtaining the IP address information from the BOOTP response packet forwarded by relay proxy servers. The content of the sub-fields can be information of interface board number, port number, slot number or Virtual Path Identifier/Virtual Channel Identifier (VPI/VCI) of an ATM Permanent Virtual Connection (PVC) of said device. Each sub-field alone cannot be a unique identifier of the device, but combination of all sub-fields can be used for identifying the device uniquely. With this method, a device can automatically obtain an IP address through BOOTP, so configuration and maintenance for devices becomes simple.

5 Claims, 1 Drawing Sheet

U.S. PATENT DOCUMENTS

| | | | |
|---|---|---|---|
| 6,625,145 B1 * | 9/2003 | Winell | 370/389 |
| 6,697,360 B1 * | 2/2004 | Gai et al. | 370/389 |
| 6,782,474 B1 * | 8/2004 | Ylonen | 713/162 |
| 6,826,611 B1 * | 11/2004 | Arndt | 709/226 |
| 6,982,953 B1 * | 1/2006 | Swales | 370/218 |
| 2003/0061376 A1 * | 3/2003 | Li et al. | 709/238 |

FOREIGN PATENT DOCUMENTS

| | | |
|---|---|---|
| CN | 1282482 | 1/2001 |
| WO | WO 99/33239 | 7/1999 |
| WO | WO 99/38303 | 7/1999 |
| WO | WO 00/08822 | 2/2000 |
| WO | WO 01/11904 | 2/2001 |

* cited by examiner

METHOD FOR APPARATUS ACQUIRING IP ADDRESS AUTOMATICALLY

FIELD OF THE TECHNOLOGY

The present invention relates to communication technology, specifically to a method for a device in a base station of mobile communication system to obtain IP address automatically.

BACKGROUND OF THE INVENTION

In a communication system, TCP/IP protocol is often used for communication between devices or systems, so the devices applying TCP/IP protocol must be assigned IP addresses correspondingly.

The simplest method for assigning IP addresses to devices is assigning them by maintainers. Nevertheless, this will increase complexity of device maintenance.

The technology of automatically obtaining IP address can make device maintenance simple. The protocols usually used in this technology include: Reverse Address Resolution Protocol (RARP), Bootstrap Protocol (BOOTP) and Dynamic Host Configuration Protocol (DHCP).

The common feature of these three protocols is that a device requesting an IP address sends a request containing network interface hardware address (such as Ethernet address) information of itself to a server, then the server assigns an IP address to the device based on the hardware address. Nevertheless, RARP can only make a device obtain an IP address, the request for an IP address cannot be forwarded by a router, so a server must be set in each network segment, which limits the application range of this protocol. BOOTP can make a device obtain not only IP address information, but also additional information, such as boot file name, etc. Besides, BOOTP request packets can be forwarded by a router (BOOTP relay proxy), so this protocol can be used in a wide range. DHCP is an expansion of BOOTP with the ability of assigning reusable IP addresses automatically.

For standard RARP, BOOTP and DHCP, it is required that a device requesting an IP address has a unique hardware address of network interface for identifying itself. A device which communicates with other devices through Ethernet takes Ethernet address as it unique identifier. Nevertheless, for devices applying such as IP Over ATM (IPOA) protocol for communication, assigning a hardware address to a device is as complex as assigning an IP address to the device. In other word, if it is not difficult to assign a unique hardware address to the device, then it is not difficult to assign an IP address to the device, that is, it is no necessary for the device to obtain IP address automatically.

SUMMARY OF THE INVENTION

An object of the present invention is to provide a method for a device without unique hardware address to obtain an IP address automatically. The method uses BOOTP to obtain IP address.

In order to accomplish the above object, a method for a device to obtain IP address automatically is provided, which includes:

a device dividing the hardware address field in a Bootstrap Protocol (BOOTP) request packets into at least two sub-fields;

filling in each sub-field of hardware address field by the device and a relay proxy server or by the relay proxy server during forwarding procedure;

a BOOTP server assigning an IP address to the device according to the contents in the at least two sub-fields of the hardware address field, then generating a BOOTP response packet which includes at least the IP address of the device; and the device obtaining the IP address from the BOOTP response packet forwarded by the relay proxy servers.

A method for obtaining an IP address includes:

filling sub-fields of a hardware address field in a Bootstrap Protocol (BOOTP) request packet during forwarding the BOOTP request packet, wherein the hardware address field in the BOOTP request packet is divided into at least two sub-fields;

obtaining an IP address from a BOOTP response packet; wherein the IP address is assigning according to the contents in the at least two sub-fields.

Each sub-field alone in this invention cannot be a unique identifier of the device, but combination of all sub-fields can be used for identifying the device uniquely.

In the invention, hardware address field in BOOTP request packet is divided into several sub-fields according to the requirements for application, and some sub-fields can be neglected. There can be multiple sub-fields filled in by routers, and the number of sub-fields corresponds to the number of routers through which the BOOTP request packet passes. Content of sub-fields can be interface board number, port number, slot number and ATM Permanent Virtual Connection (PVC) information. The device can be a singleboard, such as a main control board or a service board.

With this method, a device without unique hardware address can automatically obtain an IP address through BOOTP, so unique hardware address information is not necessary in this invention, thereby configuration and maintenance for devices becomes simple.

DETAILED DESCRIPTION OF THE INVENTION

Figure 1:
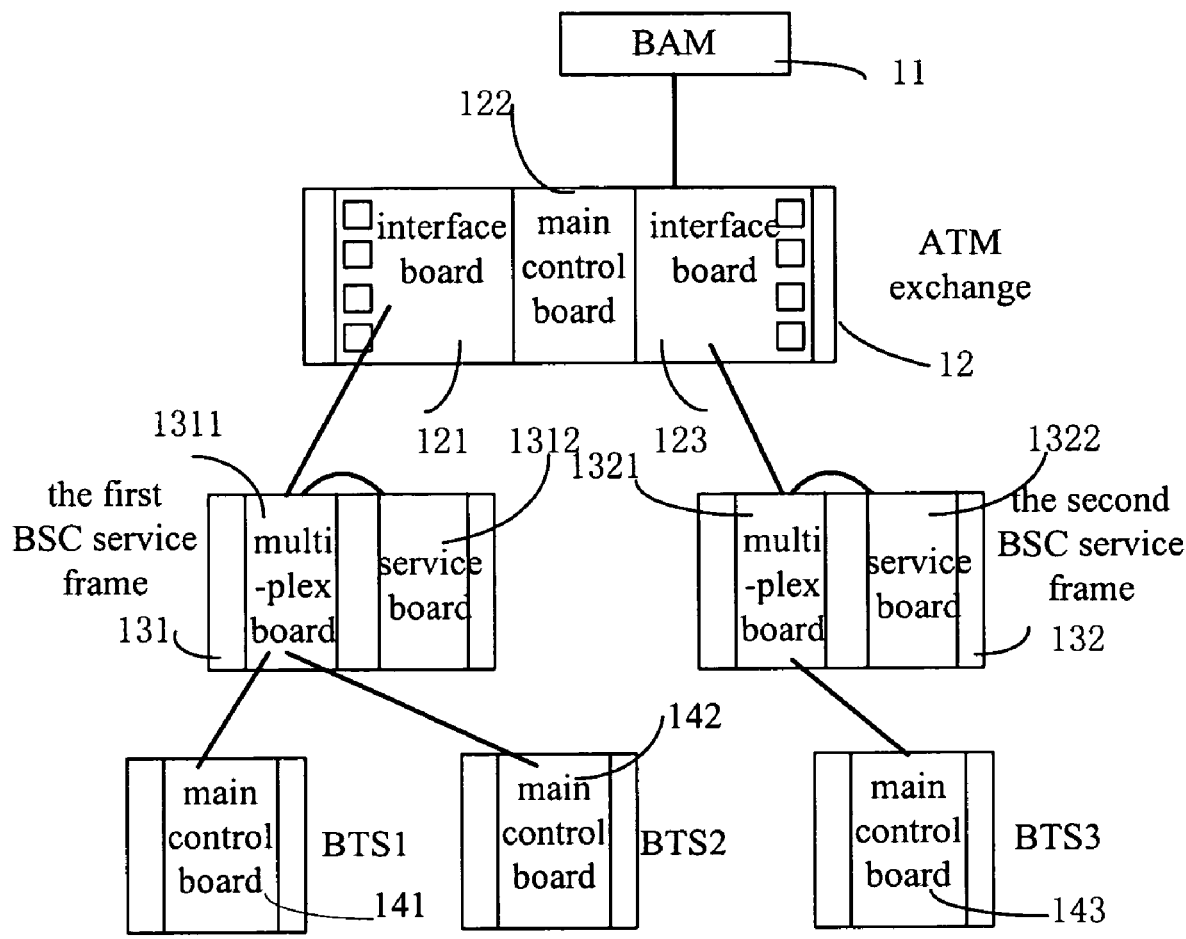
FIG. 1 is a schematic diagram illustrating the network topology structure of a base station system.

The invention will be described in more detail hereinafter with reference to the accompanying drawing.

FIG. 1 is a schematic diagram illustrating the network topology structure of a base station system, in which only the topology structure of the operation maintenance links is shown, and that of the service links is not shown. In FIG. 1, the Back Administration Module (BAM) 11 of the BOOTP server is connected to service frames of multiple Base Station Controllers (BSCs), such as the first BSC service frame 131 and the second BSC service frame 132, through the ATM exchange 12. Every BSC service frame is connected to main control boards 141, 142 and 143 of multiple Base Transceiver Stations (BTSs), such as BTS 1, BTS 2 and BTS 3, through multiplex boards 1311 and 1321.

In the first embodiment, as shown in FIG. 1, main control board 141, 142 or 143 of BTS sends an IP address request packet to BAM 11 of BOOTP server through BOOTP. As BOOTP relay proxy servers, the multiplex board 1311 or 1321 of BSC and the main control board 122 of ATM exchange 12 forward BOOTP request and response packets.

Hardware address field in BOOTP request packet is divided into two sub-fields which are filled in by multiplex board 1311 or 1321 of BSC and main control board 122 of ATM exchange 12, respectively. In detail, the method for the main control board 141, 142 or 143 of BTS to obtain IP address comprises the following steps. First, BOOTP request packet is filled in by a main control board 141, 142 or 143 of BTS, then is sent to corresponding multiplex board 1311 or 1321 of BSC. After receiving the BOOTP request packet, the multiplex board 1311 or 1321 of BSC fills Virtual Path Identifier (VPI)/Virtual Channel Identifier (VCI) of the ATM PVC which receives the BOOTP request packet in the corresponding sub-field of hardware address field, then forwards the BOOTP request packet to ATM exchange 12.

After receiving the BOOTP request packet, the main control board 122 of ATM exchange fills the number of the interface board 121 or 123 which receives the BOOTP request packet and the port number in the corresponding sub-field of hardware address field, then forwards the BOOTP request packet to the BAM 11 of BOOTP server.

After receiving the BOOTP request packet, the BAM 11 assigns an IP address according to the number of the interface board, the port number and the VPI/VCI information in the hardware address field, and generates a BOOTP response packet including the IP address of main control board 141, 142 or 143 of BTS and a gateway address, etc., and then returns it to the ATM exchange 12.

ATM exchange 12 returns the BOOTP response packet to the multiplex board 1311 or 1321 of BSC.

The multiplex board 1311 or 1321 of BSC returns the BOOTP response packet to the main control board 141, 142 or 143 of BTS.

The main control board 141, 142 or 143 of BTS receives the BOOTP response packet and obtains its IP address and gateway address information from the BOOTP response packet. So far, all steps in this embodiment are completed.

In the second embodiment, as shown in FIG. 1, service board 1312 or 1322 of BSC sends an IP address request packet to BAM 11 of BOOTP server through BOOTP. As BOOTP relay proxy servers, the multiplex board 1311 or 1321 of BSC and the main control board 122 of ATM exchange 12 forward BOOTP request and response packets.

Hardware address field of BOOTP request packet is divided into two sub-fields which are filled in by the service board 1312 or 1322 of BSC and main control board 122 of ATM exchange 12, respectively. In detail, the method for the service board 1312 or 1322 of BSC to obtain IP address comprises the following steps.

First, BOOTP request packet is filled in by a service board 1312 or 1322 of BSC, then is sent to corresponding multiplex board 1311 or 1321 of BSC.

After receiving the BOOTP request packet, the multiplex board 1311 or 1321 of BSC forwards the BOOTP request packet to ATM exchange 12.

After receiving the BOOTP request packet, the main control board 122 of ATM exchange 12 fills the number of the interface board 121 or 123 which receives the BOOTP request packet and the port number in the corresponding sub-field of hardware address field, then forwards the BOOTP request packet to the BAM 11 of BOOTP server.

After receiving the BOOTP request packet, the BAM 11 assigns an IP address according to the number of the interface board, the port number and the number of singleboard slot in the hardware address field, and generates a BOOTP response packet including information about the IP address of the service board 1312 or 1322 of BSC and boot file name, etc., and then returns it to the ATM exchange 12.

ATM exchange 12 returns the BOOTP response packet to the multiplex board 1311 or 1321 of BSC.

The multiplex board 1311 or 1321 of BSC returns the BOOTP response packet to the service board 1312 or 1322 of BSC.

The service board 1312 or 1322 of BSC receives the BOOTP response packet and obtains its IP address and the boot file name from the BOOTP response packet.

So far, all steps in this embodiment are completed.

The invention claimed is:

1. A method for a device to obtain an IP address automatically, comprising:
    a device dividing the hardware address field in a Bootstrap Protocol (BOOTP) request packet into N sub-fields, wherein N is an integer greater than 1;
    filling in each of the N sub-fields of the hardware address field by said device and a relay proxy server or by the relay proxy server and forwarding the BOOTP request packet, wherein N corresponds to the number of the device and the relay proxy server or corresponds to the number of the relay proxy servers;
    a BOOTP server combining contents filled in the N sub-fields of the hardware address field to form a unique identifier of the device, assigning an IP address to said device according to the contents in the N sub-fields of said hardware address field, then generating a BOOTP response packet which includes at least the IP address of said device; and
    said device obtaining the IP address from said BOOTP response packet forwarded by the relay proxy server;
    wherein the contents in said N sub-fields include at least one of information of interface board number, port number, slot number or Virtual Path Identifier/Virtual Channel Identifier (VPI/VCI) of an ATM Permanent Virtual Connection (PVC) of said device.

2. The method of claim 1, wherein said device is a main control board in an apparatus or a service board in an apparatus.

3. The method of claim 1, wherein said N sub-fields are filled in turn by said device and the relay proxy server or by the relay proxy server through which said BOOTP request packet passes.

4. The method of claim 1, wherein said device is a main control board of a Base Transceiver Station (BTS), said relay proxy server includes a multiplex board of a Base Station Controller (BSC) and a main control board of an ATM exchange;
    said dividing comprising: said main control board of the BTS initializing a BOOTP request packet, dividing the hardware address field of said BOOTP request packet into two sub-fields, and sending the BOOTP request packet to the multiplex board of the BSC;
    said filling comprising:
    said multiplex board of the BSC filling in VPI/VCI of ATM PVC in one sub-field of hardware address field and sending said BOOTP request packet to said main control board of ATM exchange at the next level;
    said main control board of ATM exchange filling in the number of interface board receiving said BOOTP request packet and port number in another sub-field of hardware address field, and sending said BOOTP request packet to a BOOTP server;
    said assigning and generating comprising: said BOOTP server assigning an IP address to said main control board according to the received sub-fields of the hardware address field, generating a BOOTP response packet which includes the IP address of said main control board of the BTS, and returning the BOOTP response packet to said main control board of the BTS through the main control board of the ATM exchange and the multiplex board of the BSC;

said obtaining comprising: said main control board of the BTS obtaining its IP address from the received BOOTP response packet.

5. The method of claim 1, wherein said device is a service board of a BSC, said relay proxy server includes a multiplex board of a BSC and a main control board of an ATM exchange;

said dividing comprising: said service board of the BSC initializing a BOOTP request packet, dividing the hardware address field of said BOOTP request packet into two sub-fields;

said filling comprising:

said service board of the BSC filling with the slot number in one sub-field of hardware address field, and sending the BOOTP request packet to the multiplex board of the BSC;

said multiplex board of the BSC sending said BOOTP request packet to said main control board of ATM exchange at the next level;

said main control board of ATM exchange filling in the number of interface board receiving said BOOTP request packet and port number in another sub-field of hardware address field, and sending said BOOTP request packet to a BOOTP server;

said assigning and generating comprising: said BOOTP server assigning an IP address to said main control board according to the received sub-fields of the hardware address field, generating a BOOTP response packet which includes IP address of said service board of the BSC and boot file name, and returning the BOOTP response packet to said service board of the BSC through the main control board of the ATM exchange and the multiplex board of the BSC;

said obtaining comprising: said service board of the BSC obtaining its IP address and the boot file name from the received BOOTP response packet.

* * * * *

UNITED STATES PATENT AND TRADEMARK OFFICE
CERTIFICATE OF CORRECTION

PATENT NO.        : 7,472,176 B2                                    Page 1 of 1
APPLICATION NO.   : 10/481896
DATED             : December 30, 2008
INVENTOR(S)       : Jiangchun Gu It is certified that error appears in the above-identified patent and that said Letters Patent is hereby corrected as shown below:

In the Claims:

Column 4, Line 50, Claim 4: "VPIIVCI" should be --VPI/VCI--.

Signed and Sealed this

Tenth Day of March, 2009

JOHN DOLL
*Acting Director of the United States Patent and Trademark Office*